United States Patent [19]

Schewitz

[11] Patent Number: 5,441,633

[45] Date of Patent: Aug. 15, 1995

[54] LIQUID FILTER USING FILTRATION AID

[76] Inventor: Jonathan Schewitz, 82 Devereax Avenue, Vincent, East London, Cape Province, South Africa

[21] Appl. No.: 117,609

[22] Filed: Sep. 7, 1993

[30] Foreign Application Priority Data

Sep. 25, 1992 [ZA] South Africa .................. 92/7364
Feb. 4, 1993 [ZA] South Africa .................. 93/0761

[51] Int. Cl.⁶ .................. B01D 37/02; B01D 29/90
[52] U.S. Cl. .................. 210/193; 210/323.2; 210/777; 210/778
[58] Field of Search .......... 210/777, 778, 193, 348, 210/209, 219, 198.1, 323.2

[56] References Cited

U.S. PATENT DOCUMENTS

| | | |
|---|---|---|
| 2,347,927 | 5/1944 | Paterson . |
| 2,423,172 | 7/1947 | Booth . |
| 2,523,793 | 9/1950 | Vance . |
| 2,600,458 | 6/1952 | Ackley . |
| 2,693,882 | 11/1954 | Olson . |
| 2,720,314 | 10/1955 | Booth . |
| 2,742,158 | 4/1956 | Schuller . |
| 2,784,846 | 3/1957 | Olson . |
| 2,862,622 | 12/1958 | Kircher . |
| 2,937,752 | 5/1960 | Deschere . |
| 3,438,502 | 4/1969 | Schmidt . |
| 3,498,460 | 3/1970 | Lane . |
| 3,891,551 | 6/1975 | Tiedmann . |
| 4,051,033 | 9/1977 | Blace . |
| 4,243,533 | 1/1981 | Savolainen . |
| 4,277,337 | 7/1981 | Zdansky . |
| 4,289,630 | 9/1981 | Schmidt . |
| 4,293,414 | 10/1981 | Gianneli . |
| 4,388,197 | 6/1983 | Lumikko . |
| 4,517,086 | 5/1985 | Romey . |
| 4,526,688 | 7/1985 | Schmidt . |
| 4,592,847 | 6/1986 | Schumacher . |
| 4,704,210 | 11/1987 | Boze . |
| 4,786,408 | 11/1988 | Sahara . |
| 4,872,981 | 10/1989 | Hobson . |
| 4,919,801 | 4/1990 | Hobson . |
| 5,013,461 | 5/1991 | Driori . |
| 5,047,123 | 9/1991 | Arvanitakis . |
| 5,112,481 | 5/1992 | Priori . |
| 5,128,038 | 7/1992 | Slavitschek . |

FOREIGN PATENT DOCUMENTS

| | | |
|---|---|---|
| 242284 | 9/1960 | Australia . |
| 1410811 | 10/1961 | Germany . |
| 2631394 | 1/1978 | Germany . |
| 2656512 | 6/1978 | Germany . |
| 63-65920 | 3/1988 | Japan . |
| 1-119317 | 5/1989 | Japan . |
| 1-284317 | 11/1989 | Japan . |

*Primary Examiner*—Thomas M. Lithgow
*Attorney, Agent, or Firm*—Davis Hoxie Faithfull & Hapgood

[57] ABSTRACT

A liquid filter assembly is provided of the type having a container, a liquid inlet, a liquid outlet and a filter medium adapted to operate in conjunction with a filtration aid such as diatomaceous earth. The filter medium is of the type which the filtration aid falls off at the end of a cycle and becomes mixed with liquid and redeposited on the filter medium at the commencement of a new cycle. The liquid inlet has a cowl directed downwardly and at the incline to a radius of the container in plan view to direct incoming fluid towards the bottom of the container to properly distribute filtration aid from the container bottom.

9 Claims, 1 Drawing Sheet

LIQUID FILTER USING FILTRATION AID

FIELD OF THE INVENTION

THIS INVENTION relates to a liquid filter of the type employing a filtration medium, such as a fabric or porous panel through which liquid is to pass upon filtration, and wherein a filtration aid is used in combination with the filter medium to form a layer on the filter medium. Dirt then becomes deposited on the layer of filtration aid rather than directly on the filter medium. The filtration aid is most commonly diatomaceous earth, although the invention is not to be interpreted as being limited to this specific filtration aid.

BACKGROUND TO THE INVENTION

Filters which employ a filter medium and a filtration aid in order to avoid blinding of the filter medium and thereby to extend the cycle time between backwashing procedures, generally operate on the principle that inlet fluid serve to stir up the filtration aid which then becomes deposited on the filter medium. The latter may be a fabric the form of a bag or sleeve supported over a framework. When the filter is switched off for a period of time, the mixture of dirt and filtration aid, which is typically diatomaceous earth, falls off the filter medium and becomes deposited on the bottom of the filter container.

When the filter is re-started the turbulence of liquid in the filter tank causes the mixture of filter aid and dirt to lift off the bottom of the container and become re-deposited on the filter medium.

It is important that the filter aid become reasonably evenly deposited over the entire surface area of the filter medium and, where the filter medium comprises a large number of tubular sleeves supported on frames therefor wherein the sleeves all extend parallel to each other, generally in a substantially vertical direction, the distribution of the filtration aid may be somewhat uneven.

It is the object of this invention to provide a liquid filter in which the distribution of filtration aid deposited on the bottom of a filter container during off periods is effectively mixed with incoming liquid to be filtered so as to enhance the distribution of the filtration aid over the surface area of the filter medium in the filter.

SUMMARY OF THE INVENTION

In accordance with this invention there is provided a liquid filter assembly comprising a filter container having a generally cylindrical shape, an inlet through the side of the container towards the lower end thereof, an outlet from the container, and a filter medium interposed between the inlet and outlet and adapted to be utilised in combination with a filtration aid and wherein operation of the filter results, at termination of an operating cycle, in filtration aid and dirt associated therewith falling to the bottom of the container, the filter being characterised in that the inlet is fitted with a cowl adapted to direct inlet liquid downwardly towards the bottom of the container and in a direction at an incline to a radius of the container in plan view.

Further features of the invention provide for the cowl to decrease somwhat in diameter from the inlet end thereof to the outlet end thereof to thereby accelerate liquid passing therethrough and for the inlet to be provided with a non-return valve, conveniently a wafer type plastics non-return valve. Conveniently the axis of the cowl can be directed at an angle of between 30° and 60°, preferably about 45° to an intersecting radius of the container in plan view, and at an angle of between 30° and 60°, preferably about 40° downwardly relative to the horizontal. Also, the bottom of the container is preferably internally concave.

In order that the invention may be more fully understood one embodiment thereof will now be described with reference to the accompanying drawings.

DETAILED DESCRIPTION WITH REFERENCE TO THE DRAWINGS

Figure 1:
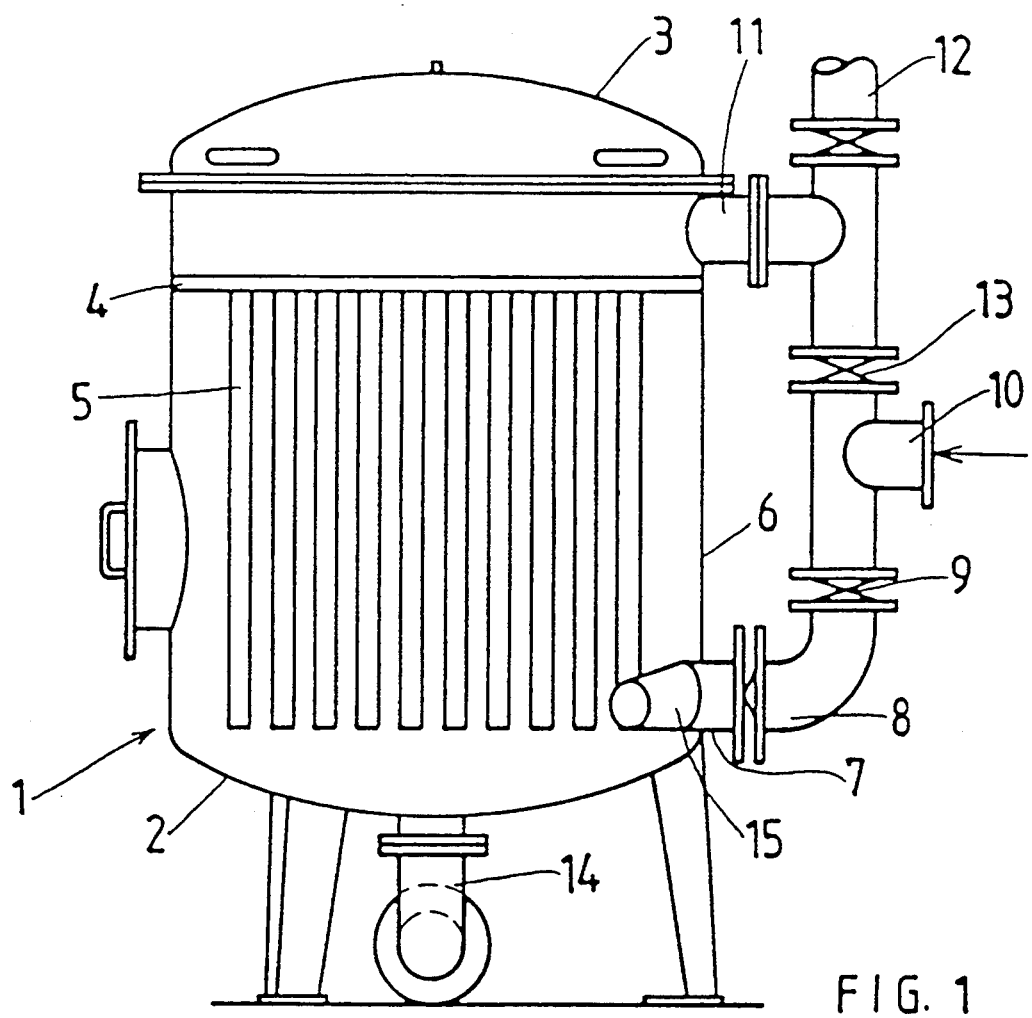
FIG. 1 is a schematic sectional elevation of a liquid filter assembly embodying the expedient of this invention.

In the embodiment of the invention illustrated in the drawings a liquid filter comprises a container 1 of circular cylindrical shape having a concave lower end 2 and a correspondingly convex lid 3 removably secured thereto.

Towards the upper end of the container is a divider plate 4 which supports the upper ends of a array of elongate tubular filtration elements 5 each of which has a fabric sleeve supported on a supporting frame therefor. The filter elements extend downwardly towards the bottom of the container.

Located in the side wall 6 of the container towards the bottom thereof is an inlet 7 fitted with a wafer non-return valve 8 and connected through a control valve 9 to an inlet 10 for liquid to be filtered.

The upper end of the container has an outlet 11 through the side wall thereof located on the upper side of the dividing wall 4.

Thus, in use, liquid will enter through the inlet 7, pass through the fabric being the filtration medium of the sleeves and which supports a filtration aid such as diatomaceous earth, up the tubular filter elements 5 into the upper region of the container 1 and out of the outlet 11.

The outlet 11 is connected to a filtered liquid return pipe 12 to a circuit and also through a control valve 13 to the inlet in order to enable backwashing procedures to take place. Also for the purpose of carrying out backwashing procedures, the bottom of the container is provided with a drainage outlet 14.

Figure 2:
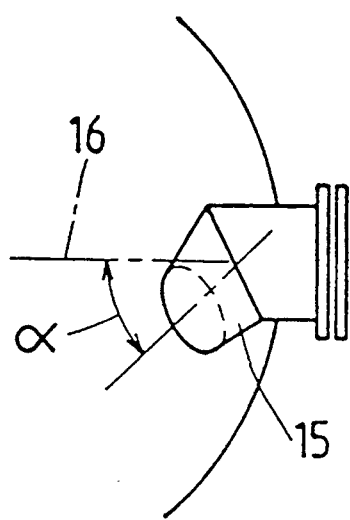
FIG. 2 is a detailed plan view of the inlet thereto, and,
FIG. 3 is a detailed elevation of the inlet thereto.
Figure 3:
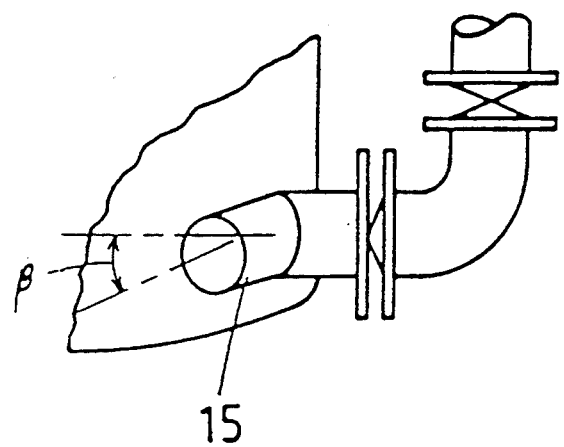

The filter assembly described above has its inlet fitted with a cowl 15 according to the invention. The cowl 15 is directed at an angle of about 45° to an intersecting radius indicated by numeral 16 of the container as shown by angle α in FIG. 2. Furthermore, the cowl axis is directed at an angle β to the horizontal as shown in FIG. 3, the angle β conveniently being about 35° or 40°.

With the cowl described above, and starting the filter with, for example diatomaceous filtration aid in the bottom thereof, the cowl causes inlet liquid to be directed downwardly in a swirling action over the bottom of the container and, this being so, causes an even distribution of filtration aid to be introduced into the liquid and become coated evenly over the filtration medium formed by the sleeves.

It has been found that use of the expedient of this invention results in diatomaceous earth, or other filtration aid, becoming evenly coated over the filtration medium in a reliable and consistent manner.

It will be understood that numerous variations may be made to the embodiment of the invention described above without departing from the scope hereof. In particular, the direction in which the cowl axis is arranged can be varied widely and will depend, to a large extent, on flow rates, throughput, physical shape and configuration of the bottom of the filter, as well as the nature and configuration of the filtration medium.

What I claim as new and desire to secure by Letters Patent is:

1. A liquid filter assembly comprising a filter container having a generally cylindrical shape, an inlet through the side of the container towards the lower end thereof for inlet liquid, an outlet from the container, and a filter medium interposed between the inlet and outlet for filtering liquid that flows from said inlet to said outlet and adapted to be utilized in combination with a filtration aid and wherein operation of the filter results, at termination of an operating cycle, in filtration aid and dirt associated therewith falling to the bottom of the container, the inlet is fitted with a cowl which defines an inlet opening, the inlet opening is directed downwardly towards the bottom of the container at an angle $\beta$ with respect to a horizontal plane and into the container at an angle $\alpha$ with respect to a radius of the container, wherein $\alpha$ and $\beta$ each define an angle of from 30° to 60°.

2. A filter assembly as claimed in claim 1 in which the cowl is tubular and decreases in diameter from its inlet end to its outlet end.

3. A filter assembly as claimed in claim 1 in which the inlet has a non-return valve in line therewith.

4. A filter assembly as claimed in claim 3 in which the non-return valve is a plastics wafer type non-return valve.

5. A filter assembly as claimed in claim 1 in which $\alpha$ defines an angle of about 45° and $\beta$ defines an angle of about 40°.

6. A filter assembly as claimed in claim 1 in which the bottom of the container is internally concave.

7. A liquid filter assembly for removing dirt from a liquid comprising:

a filter container with a lower end and an upper end having an inlet disposed near the lower end and an outlet;

a filter medium disposed within the filter container between the inlet and the outlet such that the liquid to be filtered flows from the inlet, through the filter medium, to the outlet;

a filter aid disposed in the filter container which becomes operatively deposited on the filter medium during operation of the assembly to remove dirt from the liquid; and a cowl mounted at the inlet and defining an inlet opening, said inlet opening is pointing down toward the lower end of the container at an angle $\beta$ with respect to a horizontal plane and directed into the container at an angle $\alpha$ with respect to a radius of the container, wherein said $\alpha$ and $\beta$ each define an angle of from about 30° to 60° such that flow of liquid is directed toward the lower end and creates a swirling action, wherein the filter aid and removed dirt fall to the lower end of the container when the assembly is not in operation;

wherein the filter aid and dirt are mixed with incoming liquid upon recommencement of operation of the assembly such that the filter aid and at least a portion of the dirt become redeposited on the filter medium.

8. The liquid filter assembly of claim 7 wherein $\alpha$ is about 45°.

9. The liquid filter assembly of claim 7 wherein $\beta$ is about 40°.

* * * * *